United States Patent [19]
Furtner

[11] 3,983,792
[45] Oct. 5, 1976

[54] HYDRAULIC HAND BRAKE FOR PRESSURE MEDIUM ACTUATED BRAKES OF RAILWAY VEHICLES

[75] Inventor: Walter Furtner, Rosenheim, Germany

[73] Assignee: Knorr-Bremse GmbH, Munich, Germany

[22] Filed: Apr. 16, 1975

[21] Appl. No.: 568,800

[30] Foreign Application Priority Data
May 8, 1974 Germany............................ 2422167

[52] U.S. Cl. ........................................ 92/17; 92/24; 92/27; 92/31; 92/63; 92/107; 92/130 R; 188/265; 192/111 A
[51] Int. Cl.² ........................................ F15B 15/26
[58] Field of Search .................. 92/17, 19, 63, 107, 92/20, 24, 27, 28, 31, 32, 64, 22, 130 R; 188/265; 192/111 A

[56] References Cited
UNITED STATES PATENTS

| | | | |
|---|---|---|---|
| 2,873,579 | 2/1959 | Safford | 188/265 X |
| 3,051,136 | 8/1962 | Muehlhausen | 92/107 X |
| 3,331,472 | 7/1967 | Swift | 192/111 A |
| 3,472,124 | 10/1969 | Roselius | 92/17 X |
| 3,597,016 | 8/1971 | Gachot | 188/265 X |
| 3,738,229 | 6/1973 | Kraft | 92/17 |
| 3,756,361 | 9/1973 | Persson | 192/111 A |
| 3,765,522 | 10/1973 | Dahlkvist | 192/111 A |
| 3,809,189 | 5/1974 | Farr | 192/111 A |
| 3,826,176 | 7/1974 | Ike | 92/63 X |

*Primary Examiner*—Martin P. Schwadron
*Assistant Examiner*—Abraham Hershkovitz
*Attorney, Agent, or Firm*—Edmund M. Jaskiewicz

[57] ABSTRACT

A hydraulic hand brake for a fluid pressure actuated brake on a railway vehicle has a cylinder and piston assembly extending coaxially from the brake cylinder. A threaded rod having a non-locking thread extends from the piston and has threaded thereon a traveling nut with a coupling surface on a side away from the brake piston engageable with a second coupling surface on a ring attached to the cylinder. A spring urges the nut in the direction to engage the coupling surfaces and a control piston engages the nut to disengage the coupling surfaces when the control piston is subjected to a hydraulic pressure. Subjecting the piston of the cylinder and piston assembly to a hydraulic pressure will cause the threaded rod to engage the brake piston and to move the brake piston in the braking direction.

6 Claims, 1 Drawing Figure

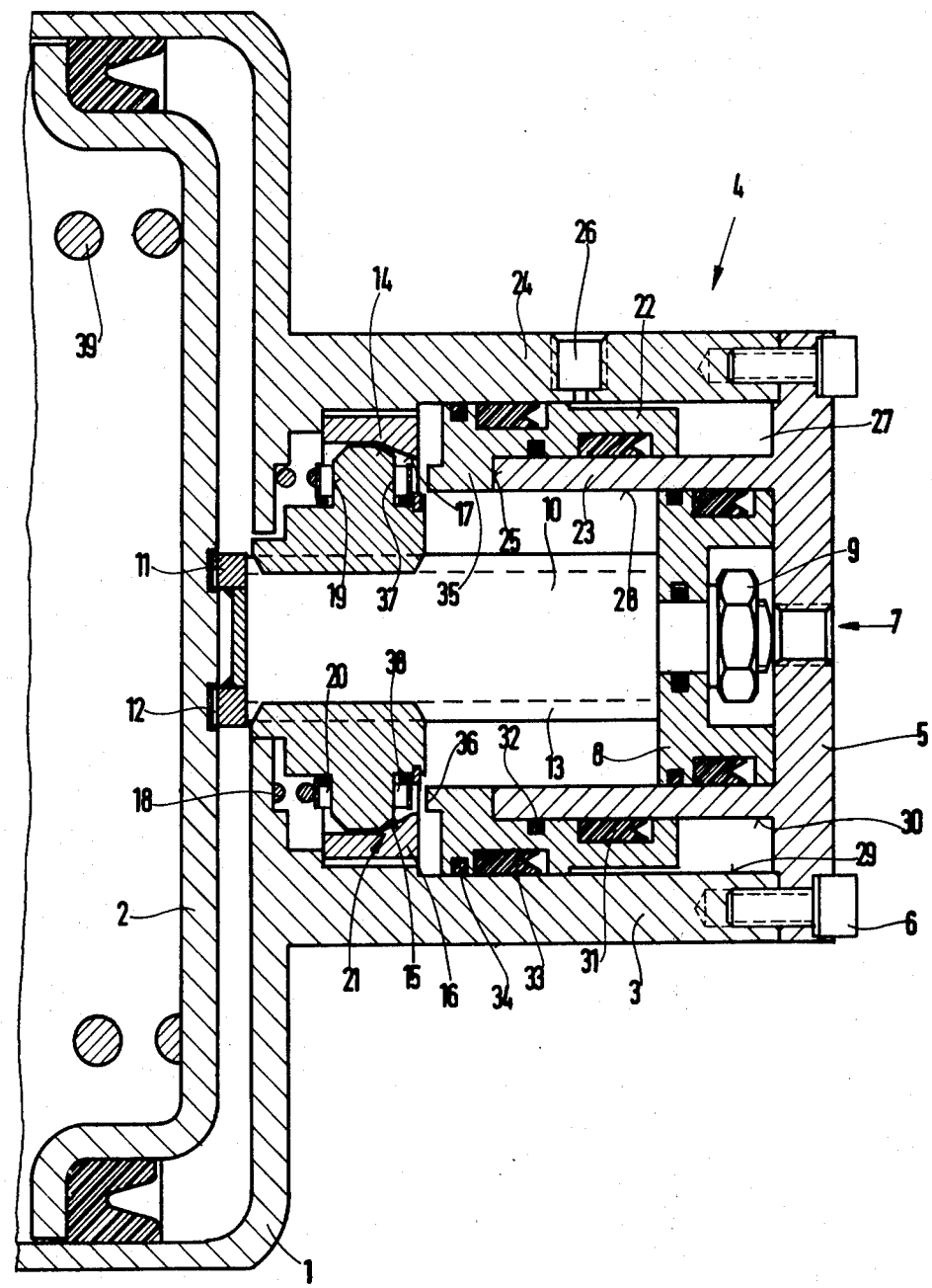

HYDRAULIC HAND BRAKE FOR PRESSURE MEDIUM ACTUATED BRAKES OF RAILWAY VEHICLES

The present invention relates to a hydraulic hand brake for pressure medium actuated brakes of railway vehicles, more particularly, to a coupling arrangement within such a hand brake which secures the hand brake in the actuated position and which can be selectively hydraulically disengaged.

Various forms of hand brakes have been provided for pressure medium actuated brakes on railway vehicles. One form of a hydraulic hand brake comprises a cylinder and piston assembly flanged to the brake cylinder with its piston being displaceable in a cylinder which is rigidly attached to the brake cylinder. The piston is coupled to the brake piston by a push rod in the form of a threaded shaft having a reversible or nonselflocking thread with the push rod being acted upon by a hydraulic fluid in the direction of displacement of the brake piston to operate the brake. A nut is threaded on the shaft and there is provided a locking mechanism for the nut which mechanism can be disengaged through the action of hydraulic fluid on a control piston.

A particular structure of such a hydraulic hand brake is disclosed in the German published specification No. 2,158,507 wherein the nut is supported on both sides by thrust bearings and is engaged to a coupling ring through a one-way coupling. The coupling ring may be engaged to a coupling sleeve by means of a jaw clutch that is releasible by a control piston acting against a spring force. The coupling sleeve is guided by means of wedges and grooves on the threaded shaft so as to be axially displaceable thereon but is retained against rotation. Since the nut on the shaft is retained against axial displacement such a cylinder and piston device requires two consecutive positioned couplings for locking and releasing. The necessity of providing two such coupling arrangements significantly increases the cost of the device and the wedge and nut guide of the coupling sleeve represents a further expensive component which is subjected to considerable wear.

It is therefore the principal object of the present invention to provide a novel and improved hydraulic hand brake for pressure medium actuated brakes of railway vehicles.

It is another object of the present invention to provide such an improved hydraulic hand brake having a coupling therein for securing the hand brake in the actuated position and which can be selectively hydraulically disengaged.

It is a further object of the present invention to provide such a hydraulic hand brake which is simple in structure, inexpensive to manufacture and requires a minimum of components which are sufficiently rugged to provide long and reliable operating life.

According to one aspect of the present invention a hydraulic hand brake for a fluid pressure actuated brake on a railway vehicle having a brake cylinder and a brake piston slidable therein may comprise a second cylinder and piston mounted on the brake cylinder and a threaded rod extending from the second piston engageable with the brake piston when the second piston is displaced in the braking direction. A traveling nut is threaded upon a reversible thread on the rod and the nut is provided with a first coupling surface on a side thereof away from the brake piston. A coupling ring is attached to the second cylinder and has a second coupling surface thereon engageable with the nut first coupling surface. A spring urges the nut in the direction to engage the coupling surfaces. A control piston is provided which has a portion thereof engageable with the nut to disengage the coupling surfaces when the control piston is subjected to a hydraulic pressure.

The components of the hydraulic hand brake of this invention can be readily installed and replaced with a minimum of time. The hand brake includes a relatively simple coupling and avoids the previously employed nut and wedge guide. As a result, the simple coupling structure of the present hand brake provides long reliable operating life with a minimum of servicing and maintenance.

Other objects and advantages of the present invention will be apparent upon reference to the accompanying description when taken in conjunction with the single FIGURE of the drawing, which is exemplary, and which shows a longitudinal sectional view of a hydraulic hand brake according to the present invention.

In the drawing, there is illustrated a rear portion 1 of a railway vehicle brake cylinder within which is slidably displaceable, as known in the art, a brake piston 2 which is loaded by a compression spring 39. A cylinder-piston assembly 4 is mounted co-axially on the rear face of the brake cylinder 1 and comprises a cylinder 3 rigidly secured to the brake cylinder 1 and closed on its other end by an end cover 5 secured by means of screws 6. The end cover 5 is provided with an inlet opening 7 through which a pressure medium is introduced to exert a hydraulic action on a piston 8 which is rigidly connected to a threaded spindle shaft 10 by means of a screw connection 9. The other end of the threaded spindle shaft 10 which faces the brake piston 2 is provided with a push rod 11 that can be coupled to the brake piston 2 and when coupled can be secured against rotation by means of radial projections 12 provided on the end of the push rod 11 and received within corresponding notches in the brake piston 2.

The threaded shaft 10 is provided with a reversible or non-self-locking thread 13 upon which is threaded a nut 14 which is capable of rotation on the shaft 10. The radial outer edge of the nut 14 on the side away from the brake piston 2 is provided with a conical coupling surface 15 which is engageable with a corresponding coupling surface 17 formed on a coupling ring 16 which is securely connected to the cylinder 3. A spring 18 acts upon a thrust bearing 20 located on a radial surface 19 of nut 14 which faces the brake piston 2 so as to load the nut 14 in the direction to engage the coupling surfaces 15 and 17. The coupling surfaces 15 and 17 which may be provided with toothed indentations in order to intensify the coupling effect and to achieve a positive coupling, form a coupling 21 which can be disengaged when hydraulic action is exerted against a control piston 22. Piston 22 will shift the nut 14 against the force of spring 18.

A cylindrical portion 23 is rigidly attached to the end cover 5 and extends axially therefrom so as to project in a cantilever fashion within a portion 24 of the cylinder 3. End face 25 of the cylinder 23 is located substantially at the center of the longitudinal portion 24. The cylinder portions 23 and 24 which are concentric with each other are spaced from each other to define an annular chamber 27 which can be subjected to the action of a pressure medium introduced through an inlet opening 26 in the cylinder 3. The piston 8 is axially displaceable within a cylindrical bore 28 formed within the inner cylindrical portion 23. The control piston 22 comprising an annular piston is guided between cylindrical portions 23 and 24 on an inner wall surface 29 of the cylinder 3 on the one hand and on the other hand on an outer cylindrical surface 30 on the inner cylindrical portion 23. The control piston 22 is provided with pressure-tight seals comprising packings 31 and 32 with respect to the inner cylindrical portion 23 and packings 33 and 34 with respect to the outer cylindrical portion 24.

The control piston 22 is provided with an internal flange portion 35 which abuts against the end face 25 of cylindrical portion 23 and the flange is provided with an abutment 36 which projects axially with respect to the end face 25 of the cylindrical portion 23. When the control piston 22 is subjected to the action of a hydraulic fluid introduced into the chamber 27, the abutment 36 will press against a thrust bearing 38 located on a radial surface 37 of nut 14 and produce a force to separate coupling surfaces 15 and 17 to disengage the coupling 21.

In the drawing, the piston and cylinder device 4 is illustrated in its initial position from which it is ready to operate.

When the hand brake is operated, a fluid pressure medium is introduced through inlet 7 from a source of fluid pressure medium that is not illustrated, so that the piston 8 is subjected to the action of the pressure medium in accordance with the magnitude of the desired brake pressure to be applied. The piston 8 is thus displaced toward the left as shown in the drawing in a direction toward the brake cylinder 1 against the force exerted by spring 39 and at the same time the threaded spindle 10 is moved in the same direction to enable push rod 11 to be nonrotatably coupled to the brake piston 2. The brake piston 2 is displaced toward the left as shown in the drawing and actuates in the customary manner the brake on the railway vehicle which is not illustrated.

The movement of the threaded spindle 10 to the left is transmitted to the nut 14 which will be separated from the coupling surface 17 on the coupling ring 16. After separation of coupling surfaces 15,17 the nut 14 to rotate on the reversible thread 13. The bearings 20 and 38 permit rotation of nut 14. The spring 18 will be slightly tensioned and will exert a force such that the nut 14 will be displaced axially to the right as shown in the drawing. This axial displacement will continue until the coupling surfaces 15 and 17 are again in coupled relationship so that the coupling 21 is locked and retains the nut 14 against rotation. Should the pressure in the hydraulic system be decreased intentionally or accidently so as to cause a corresponding decrease in pressure behind the piston 8, the piston 8 and the threaded piston shaft 10 will remain unchanged in position since the nut 14 is retained firmly against rotation because of the engagement of the coupling surfaces 15 and 17. Further, the nut 14 acting through the thread 13 retains the threaded spindle shaft 10 as well as the brake piston 2 which is in contact with the spindle shaft in unchanged position. Therefore, the hand brake remains applied without any change occurring even though the pressure in the hydraulic system should decrease.

In order to subsequently release the hand brake while the hydraulic system is switched off, a pressure medium is introduced through inlet 26 into annular chamber 27 to act upon the control piston 22. Control piston 22 is axially displaced toward the left as seen in the drawing such that abutment 36 will contact the nut 14 via thrust bearing 37 and the nut 14 will be shifted somewhat to the left against the force exerted by spring 18 while being simultaneously disengaged from coupling surface 17. The nut 14 is now free to rotate upon the threaded spindle shaft 10 which is returned back into its initial position through force exerted through the spring 39 while the nut 14 is rotating but spindle shaft 10 is retained against rotation by the radial ribs 11. Consequently, the brake is released.

Subsequently the operating pressure in the annular chamber 27 is reduced as a result of which the abutment 36 of control piston 22 is separated from thrust bearing 38 until the nut 14 again contacts coupling surface 17 of coupling ring 16 under the action of spring 18. The cylinder and piston device 4 is now again disposed in its initial position as shown in the drawings.

When the brake cylinder 1 is actuated through the main, the brake piston 2 will be subjected in the normal manner to the action of the pressure medium and is displaced to the left while being separated from the push rod 11. All of the remaining components of the hydraulic hand brake will remain stationary while the brake piston 2 is so actuated.

Because of the double sealing arrangement of piston 8 and control piston 22 as shown in the drawing, it is not necessary to provide additional sealing at the point where the threaded spindle shaft 10 passes through the bottom of brake cylinder 1. The piston seals on pistons 8 and 22 can also function for sealing the chamber of brake cylinder 1 into which pressure fluid is introduced to actuate the brake piston 2. However, it should be borne in mind that the threaded spindle shaft can be sealed at the point where it passes through the bottom of brake cylinder 1 and the chamber in which the nut 14 is located can be connected to the atmosphere through a vent.

It is thus apparent that the present invention has provided a hydraulic hand brake for the brake of a railway vehicle which will remain in locked or braking relationship even upon the decrease of pressure in the hydraulic system. Further, the hand brake can be selectively disengaged merely by the actuation of the control piston by a pressure medium.

It will be understood that this invention is susceptible to modification in order to adapt it to different usages and conditions, and accordingly, it is desired to comprehend such modifications within this invention as may fall within the scope of appended claims.

What is claimed is:

1. A hydraulic hand brake for a fluid pressure actuated brake on a railway vehicle having a brake cylinder and a brake piston slidable therein, and comprising a second cylinder coaxially mounted on the brake cylinder, an inner cylindrical portion in said second cylinder and a second piston slidable in said inner cylindrical portion, a threaded rod extending from said second piston engageable with said brake piston when said second piston is displaced in the braking direction, said rod having a reversible thread thereon and a nut on said thread, said nut having a first coupling surface on a first side thereof away from said brake piston, a coupling ring securely connected to said second cylinder and having a second coupling surface engageable with said nut first coupling surface to lock said nut against rotation, a spring urging said nut in the direction to engage lockingly said coupling surfaces, a first thrust bearing on said first side of said nut and a control piston having a portion thereof directly engageable with said first thrust bearing to disengage said first and second coupling surfaces when said control piston is subjected to a hydraulic pressure so that said nut is free to rotate.

2. A hydraulic hand brake as claimed in claim 1 wherein said second cylinder comprises an outer cylindrical portion concentric with said inner cylindrical portion and defining an annular chamber therebetween, said second piston being displaceable within said inner cylindrical portion, said control piston comprising an annular piston and displaceable within said annular chamber.

3. A hydraulic hand brake as claimed in claim 2 wherein said inner cylindrical portion extends from the end of said second cylinder away from said brake cylinder and terminates within said outer cylindrical portion.

4. A hydraulic hand brake as claimed in claim 2 wherein said control piston has a flange at one end thereof extending inwardly in front of an end of said inner cylindrical portion and an axial abutment on said flange.

5. A hydraulic hand brake as claimed in claim 1 and comprising a second thrust bearing between said spring and said nut.

6. A hydraulic hand brake as claimed in claim 1 wherein said rod has radial projections on an end thereof receivable in corresponding notches in said brake piston to secure said threaded rod against rotation.

* * * * *